(No Model.)

R. F. RICE.
SAFETY CHECK VALVE.

No. 466,022. Patented Dec. 29, 1891.

Witnesses:
Arthur B. Jenkins.
H. R. Williams.

Inventor,
Robert F. Rice,
By Simonds & Burdett,
Attorneys.

UNITED STATES PATENT OFFICE.

ROBERT F. RICE, OF HARTFORD, CONNECTICUT.

SAFETY CHECK-VALVE.

SPECIFICATION forming part of Letters Patent No. 466,022, dated December 29, 1891.

Application filed July 19, 1890. Serial No. 359,269. (No model.)

*To all whom it may concern:*

Be it known that I, ROBERT F. RICE, of Hartford, in the county of Hartford and State of Connecticut, have invented certain new and useful Improvements in Safety Check-Valves, of which the following is a full, clear, and exact description, whereby any one skilled in the art can make and use the same.

The object of my invention is to provide a valve adapted to be inserted in a length of gas-pipe in such manner as to provide means in that pipe for automatically closing it against the flow of gas in cases where the pipe in a building or room has become exposed to the action of fire.

My within invention consists in the combination, with a pipe, of a sectional valve-casing inclosing a spring-seated automatic valve with guide-supports and a fusible rest; and it further consists in details of the several parts making up the device as a whole, as more particularly hereinafter described, and pointed out in the claim.

Figure 1:
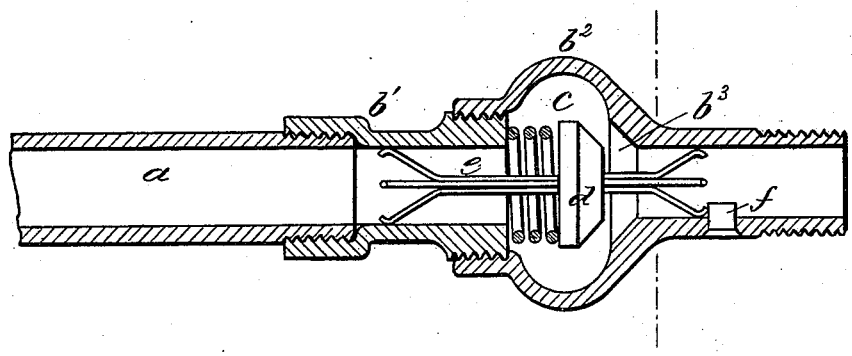
Figure 2:
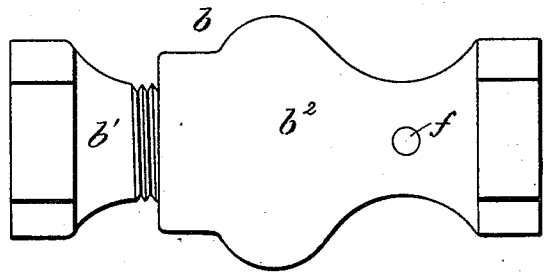
Figure 3:
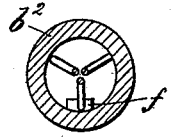

Referring to the drawings, Figure 1 is a detail view, in vertical central section, of the valve. Fig. 2 is a view of a piece of piping, illustrating the manner of connection with the check-valve. Fig. 3 is a detail view in cross-section of the valve, illustrating the manner in which the valve is held in place by the fusible support.

The improved safety-check is made of such size as to adapt it to fit upon a supply-pipe, either a main or a lateral or branch, and such pipe is denoted in the accompanying drawings by the letter $a$, the valve-body $b$ being inserted in the length of pipe and secured thereto by means of threaded parts on the one engaging threaded parts on the other. The valve-body $b$ is made in at least two sections, the larger $b^2$ having a valve-seat $b^3$ at one side of the chamber $c$ that is of sufficient size to provide for the passage of the gas through the valve-body and around the valve when open and not impede or diminish the flow of gas through the pipe. Within the valve-body there is located a valve $d$, adapted to fit the valve-seat when pressed against it in such manner as to close the passage, the valve-stem $e$ projecting in both directions from the valve, one part extending forward and resting on a support $f$, that is preferably formed by a plug made of a metal fusing at a comparatively low temperature, as of about one hundred and fifty degrees. The stem projecting rearward from the valve is skeleton in form or has radial arms, like the stem on the opposite side of the valve, these arms serving to support the valve and hold it centrally in the pipe and valve-body. Between the back of the valve and a support, as the end of the section $b'$ of the valve-body, a spring is arranged and is normally compressed when the valve is open for the passage of gas through the valve-body. In the normal condition of affairs—that is, when it is intended that the gas shall flow freely through the pipe—the valve is kept away from the seat by the stem resting against the fusible plug or like support and the spring is under compression and operating to thrust the valve toward its seat. When by reason of a fire near the pipe the temperature is raised to the fusing-point of the plug, the latter is melted and the valve quickly thrust against its seat, the pressure of the gas being aided by the spring. This automatic closing of the valve cuts off the supply and prevents the burning of gas flowing under pressure from broken pipes, that forms such a source of danger and difficulty in cases of fire in buildings.

I claim as my invention—

In a safety check-valve, in combination, the sectional valve-body with the sections in line with each other, the valve-seat within the body, the reciprocating valve fitting the said seat and supported within the valve-body by the valve-stem that projects in advance of the valve and beyond the seat, the spring thrusting normally against the back of the valve, and the fusible plug extending through the wall of the valve-body and projecting on the inside thereof in the line of movement of the valve-stem and forming a stop that holds the valve in the open position, all substantially as described.

ROBERT F. RICE.

Witnesses:
ARTHUR B. JENKINS,
ALVA OATMAN.